United States Patent
Sun et al.

(10) Patent No.: US 11,520,774 B1
(45) Date of Patent: Dec. 6, 2022

(54) CROSS ROW CONSISTENT DATA ACCESSING

(71) Applicant: Snap Inc., Santa Monica, CA (US)

(72) Inventors: Jiawen Sun, Bellevue, WA (US);
Tuncay Uzun, Seattle, WA (US);
Fengjin Liu, Bellevue, WA (US)

(73) Assignee: Snap Inc., Santa Monica, CA (US)

( * ) Notice: Subject to any disclaimer, the term of this patent is extended or adjusted under 35 U.S.C. 154(b) by 376 days.

(21) Appl. No.: 16/729,247

(22) Filed: Dec. 27, 2019

(51) Int. Cl.
*G06F 16/23* (2019.01)
*G06F 16/248* (2019.01)
*G06F 16/22* (2019.01)

(52) U.S. Cl.
CPC ...... *G06F 16/2379* (2019.01); *G06F 16/2246* (2019.01); *G06F 16/248* (2019.01)

(58) Field of Classification Search
CPC ............ G06F 16/2379; G06F 16/2246; G06F 16/248; G06F 16/2282; G06F 16/24544; G06F 16/2228
USPC ................................. 707/736, 741, 802, 803
See application file for complete search history.

(56) References Cited

U.S. PATENT DOCUMENTS

| | | | | |
|---|---|---|---|---|
| 8,073,840 | B2 * | 12/2011 | Smith | G06F 16/2456 707/714 |
| 11,243,956 | B1 * | 2/2022 | Papakonstantinou | G06F 16/24565 |
| 11,256,684 | B1 * | 2/2022 | Papakonstantinou | G06F 16/2445 |
| 2010/0005054 | A1 * | 1/2010 | Smith | G06F 16/2456 707/E17.014 |
| 2019/0188309 | A1 * | 6/2019 | Anderson | G06F 3/065 |
| 2019/0303405 | A1 * | 10/2019 | Kothari | G06F 16/2282 |

* cited by examiner

*Primary Examiner* — Phong H Nguyen
(74) *Attorney, Agent, or Firm* — Schwegman Lundberg & Woessner, P.A.

(57) ABSTRACT

A method and a system include, for each predetermined time period in a plurality of predetermined time periods, writing a plurality of data rows comprising a set of data associated with a plurality of active entities, and updating an index table based on the plurality of data rows in the stats table, wherein the index table comprises an index row. The method further includes receiving from an electronic device via an interface a query corresponding to an entity, retrieving an index value from an index row included an index row, retrieving the current value from the stats table using the index value, generating a response to the query using the index value and the current value, and displaying the response on a display of the electronic device.

18 Claims, 18 Drawing Sheets

|   | A | B | C | D | E |
|---|---|---|---|---|---|
| 1 | SECOND ROW KEY | | INDEX VALUES | | |
| | | INDEX VERSION | CAMPAIGN VERSIONS | SQUAD VERSIONS | AD VERSIONS |
| 2 | <DATA CATEGORY>#<ENTITY TYPE>#<INDEX ROOT IDENTITY> | V1 | MAP<ID, VERSION> | MAP<ID, VERSION> | MAP<ID, VERSION> |
| 3 | <LIFETIME>#<ACCOUNT>#<ACCOUNT_ID> | | | | |

FIG. 5

|   | A | B | C | D |
|---|---|---|---|---|
| 1 | FIRST ROW KEY | | DATA LABELS | |
| 2 | <ENTITY TYPE>#<ENTITY IDENTITY>#<DATA VERSION> | DATA LABEL 1 | DATA LABEL 2 | DATA LABEL 3 |
| 3 | <ENTITY TYPE 1>#<ENTITY IDENTITY 1>#<DATA VERSION 1> | DATA VALUE | DATA VALUE | DATA VALUE |
| 4 | <ENTITY TYPE 1>#<ENTITY IDENTITY 2>#<DATA VERSION 1> | DATA VALUE | DATA VALUE | DATA VALUE |
| 5 | <ENTITY TYPE 2>#<ENTITY IDENTITY 1>#<DATA VERSION 1> | DATA VALUE | DATA VALUE | DATA VALUE |
| 6 | <ENTITY TYPE 3>#<ENTITY IDENTITY 1>#<DATA VERSION 1> | DATA VALUE | DATA VALUE | DATA VALUE |
| 7 | <ENTITY TYPE 4>#<ENTITY IDENTITY 1>#<DATA VERSION 1> | DATA VALUE | DATA VALUE | DATA VALUE |

FIG. 8

|   | A | B | C | D |
|---|---|---|---|---|
| 1 | FIRST ROW KEY | | COUNTERS | |
| 2 | <ENTITY TYPE>#<ENTITY IDENTITY>#<DATA VERSION> | VIEWING | SPENDING | INTERACTION |
| 3 | <AD>#<AD 1>#<V1> | 1000 | 5 | 100 |
| 4 | <AD>#<AD 2>#<V1> | 500 | 3 | 10 |
| 5 | <SQUAD>#<SQUAD 1>#<V1> | 1500 | 8 | 110 |
| 6 | <CAMPAIGN>#<CAMPAIGN 1>#<V1> | 1500 | 8 | 110 |
| 7 | <ACCOUNT>#<ACCOUNT 1>#<V1> | 1500 | 8 | 110 |

FIG. 9

| | A | B | C | D |
|---|---|---|---|---|
| 1 | FIRST ROW KEY | | COUNTERS | |
| 2 | <ENTITY TYPE>#<ENTITY IDENTITY>#<DATA VERSION> | VIEWING | SPENDING | INTERACTION |
| 3 | <AD>#<AD 1>#<V1> | 1000 | 5 | 100 |
| 4 | <AD>#<AD 1>#<V2> | 3000 | 20 | 500 |
| 5 | <AD>#<AD 2>#<V1> | 500 | 3 | 10 |
| 6 | <SQUAD>#<SQUAD 1>#<V1> | 1500 | 8 | 110 |
| 7 | <SQUAD>#<SQUAD 1>#<V2> | 3500 | 23 | 510 |
| 8 | <CAMPAIGN>#<CAMPAIGN 1>#<V1> | 1500 | 8 | 110 |
| 9 | <CAMPAIGN>#<CAMPAIGN 1>#<V2> | 3500 | 23 | 510 |
| 10 | <ACCOUNT>#<ACCOUNT 1>#<V1> | 1500 | 8 | 110 |
| 11 | <ACCOUNT>#<ACCOUNT 1>#<V2> | 3500 | 23 | 510 |

| | A | B | C | D |
|---|---|---|---|---|
| | | | COUNTERS | |
| 1 | FIRST ROW KEY | VIEWING | SPENDING | INTERACTION |
| 2 | <ENTITY TYPE>#<ENTITY IDENTITY>#<DATA VERSION> | | | |
| 3 | <AD>#<AD 1>#<V1> | 1000 | 5 | 100 |
| 4 | <AD>#<AD 1>#<V2> | 3000 | 20 | 500 |
| 5 | <AD>#<AD 2>#<V1> | 500 | 3 | 10 |
| 6 | <AD>#<AD 3>#<V3> | 5000 | 20 | 600 |
| 7 | <SQUAD>#<SQUAD 1>#<V1> | 1500 | 8 | 110 |
| 8 | <SQUAD>#<SQUAD 1>#<V2> | 3500 | 23 | 510 |
| 9 | <SQUAD>#<SQUAD 2>#<V3> | 5000 | 20 | 600 |
| 10 | <CAMPAIGN>#<CAMPAIGN 1>#<V1> | 1500 | 8 | 110 |
| 11 | <CAMPAIGN>#<CAMPAIGN 1>#<V2> | 3500 | 23 | 510 |
| 12 | <CAMPAIGN>#<CAMPAIGN 2>#<V3> | 5000 | 20 | 600 |
| 13 | <ACCOUNT>#<ACCOUNT 1>#<V1> | 1500 | 8 | 110 |
| 14 | <ACCOUNT>#<ACCOUNT 1>#<V2> | 3500 | 23 | 510 |
| 15 | <ACCOUNT>#<ACCOUNT 1>#<V3> | 8500 | 43 | 1110 |

FIG. 11

CROSS ROW CONSISTENT DATA ACCESSING

BACKGROUND

Non-relational database provides mechanism for data storage and retrieval that is modeled in means other than the tabular relations used in traditional relational database. It is increasingly used in big data and real-time web applications. Many non-relational databases compromise data consistency in favor of scalability, flexible data schema, sparse data storage, etc.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates an example of an index table in accordance with one embodiment.

FIG. 8 illustrates an example of a stats table in accordance with one embodiment.

FIG. 9 illustrates an example of the stats table in a first data version (e.g., data version 1) in accordance with one embodiment.

FIG. 11 illustrates an example of the stats table in a third data version (e.g., data version 3) in accordance with one embodiment.

DETAILED DESCRIPTION

Current systems using a non-relation database such as a typical key value store only guarantees single row consistency, such that during data input and output, the data is only in consistent state within one row. When there is a need to output data in cross rows during data update, the output is usually incomplete because a typical key value store does not guarantee cross row data consistency during data update. As results, when data is being updated in multiple rows, reader could only get partial view of the newly updated data since the cross rows data update is not transactional. The present disclosure relates to a system and method of providing a cross row consistent data output using a non-relational database. The present disclosure enables consistent data access between cross rows during data update, and single operation look up regardless how the data grows. Specifically, the system implements simultaneously or sequentially both a data update process and a data query response process in order to allow for a cross row consistent data accessing.

For the data update process, the system can write data rows in a stats table at a regular interval of time (e.g., hourly, daily, monthly, etc.) and can update an index table based on the data rows that were written. The index table can be an index row that includes data (e.g., index value) that comprise pointers to the most current data in the stats table. The index table can provide a layer of version index control that can be used to quickly identify and locate the latest stats row that stores the most current data. Since the system can perform the data update process periodically, the system can optimize data scalability and the periodically updated index row can operate as a snapshot of the stats table. For the data query response process, the system can receive a query for data pertaining to an entity (e.g., an advertisement) at any given time during the data update process. The system can retrieve the index value from the index row. The index value can then be used to fetch the current value associated with the entity from the stats table. Using the index table, the data access between cross rows in the stats table during the data update process is always consistent and up-to-date.

Because of the one hierarchy index stays within one row, the system utilizes the index to make sure the index updates and outputs are always transactional. Therefore, the system gets consistent data version from the index with which the system can get consistent data.

Various aspects and examples will now be described. The following description provides specific details for a thorough understanding and enabling description of these examples. Those skilled in the art will understand, however, that the disclosure may be practiced without many of these details. Additionally, some well-known structures or functions may not be shown or described in detail, so as to avoid unnecessarily obscuring the relevant description.

Figure 1:
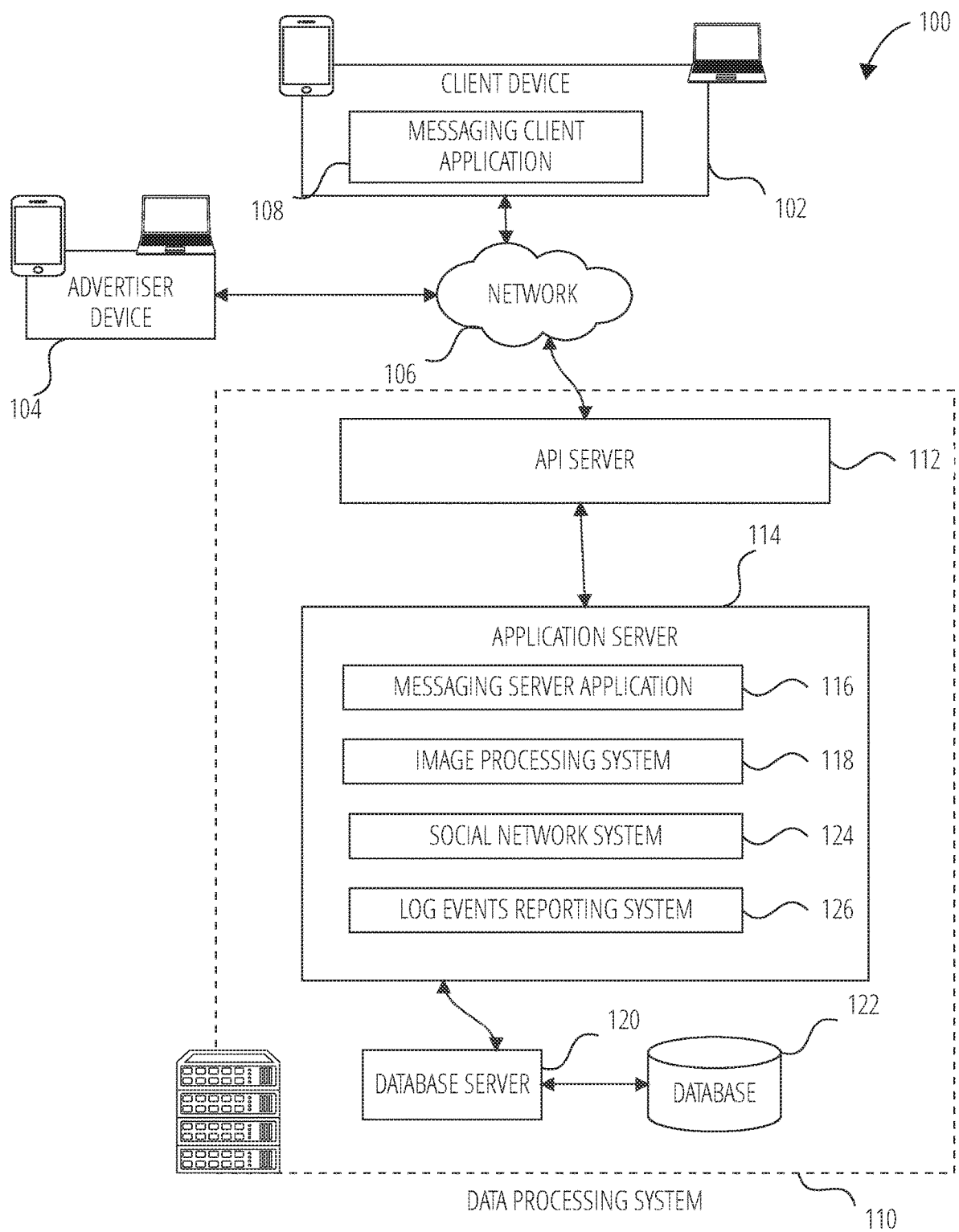
FIG. 1 is a diagrammatic representation of a networked environment in which the present disclosure may be deployed in accordance with some example embodiments.

FIG. 1 is a diagrammatic representation of a network environment 100 for exchanging data (e.g., messages and associated content) over a network according to some embodiments. The network environment 100 can include multiple instances of client device 102, each of which hosts a number of applications including a messaging client application 108. Each messaging client application 108 is communicatively coupled to other instances of the messaging client application 108 and a data processing system 110 via a network 106 (e.g., the Internet). The network environment 100 can also include multiple instances of an advertiser device 104. The multiple instances of advertiser device 104 are communicatively coupled to the data processing system 110 via the network 106.

A messaging client application 108 is able to communicate and exchange data with another messaging client application 108 and with the data processing system 110 via the network 106. The data exchanged between messaging client application 108, and between a messaging client application 108 and the data processing system 110, includes functions (e.g., commands to invoke functions) as well as payload data (e.g., text, audio, video or other multimedia data).

The data processing system 110 provides server-side functionality via the network 106 to a particular messaging client application 108. While certain functions of the diagrammatic representation of a network environment 100 are described herein as being performed by either a messaging client application 108 or by the data processing system 110, the location of certain functionality either within the messaging client application 108 or the data processing system 110 is a design choice. For example, it may be technically preferable to initially deploy certain technology and functionality within the data processing system 110, but to later migrate this technology and functionality to the messaging client application 108 where a client device 102 has a sufficient processing capacity.

The data processing system 110 supports various services and operations that are provided to the messaging client application 108. Such operations include transmitting data to, receiving data from, and processing data generated by the messaging client application 108. This data may include, message content, client device information, geolocation information, media annotation and overlays, message content persistence conditions, social network information, and live event information, advertisements information, as examples. Data exchanges within the messaging system 100 are invoked and controlled through functions available via user interfaces (UIs) of the messaging client application 108.

Turning now specifically to the data processing system 110, an Application Program Interface (API) server 112 is coupled to, and provides a programmatic interface to, an application server 114. The application server 114 is communicatively coupled to a database server 120, which facilitates access to a database 122 in which is stored data associated with messages processed by the application server 114.

The Application Program Interface (API) server 112 receives and transmits data such as message data (e.g., commands and message payloads) and advertisement data between the client device 102 and the application server 114. The Application Program Interface (API) server 112 also receives and transmits data such as queries requesting status of advertisements performed in client device 102 between advertiser device 104 and the application server 114.

Specifically, the Application Program Interface (API) server 112 provides a set of interfaces (e.g., routines and protocols) that can be called or queried by the messaging client application 108 and advertiser device 104 in order to invoke functionality of the application server 114. The Application Program Interface (API) server 112 exposes various functions supported by the application server 114, including account registration, login functionality, the sending of messages, via the application server 114, from a particular messaging client application 108 to another messaging client application 108, the sending of media files (e.g., images or video) from a messaging client application 108 to the messaging server application 116, and for possible access by another messaging client application 108, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 108).

The Application Program Interface (API) server 112 also exposes functions supported by the application server 114, including account registration, login functionality, the sending and receiving of messages or queries, via the application server 114, to the log events reporting system 126, and for possible access by another advertiser device 104.

The application server 114 hosts a number of applications and subsystems, including a messaging server application 116, an image processing system 118, a social network system 124, and a log events reporting system 126. The messaging server application 116 implements a number of message processing technologies and functions, particularly related to the aggregation and other processing of content (e.g., textual and multimedia content) included in messages received from multiple instances of the messaging client application 108. As will be described in further detail, the text and media content from multiple sources may be aggregated into collections of content (e.g., called stories or galleries). These collections are then made available, by the messaging server application 116, to the messaging client application 108. Other processor and memory intensive processing of data may also be performed server-side by the messaging server application 116, in view of the hardware requirements for such processing.

The application server 114 also includes an image processing system 118 that is dedicated to performing various image processing operations, typically with respect to images or video received within the payload of a message at the messaging server application 116.

Figure 16:
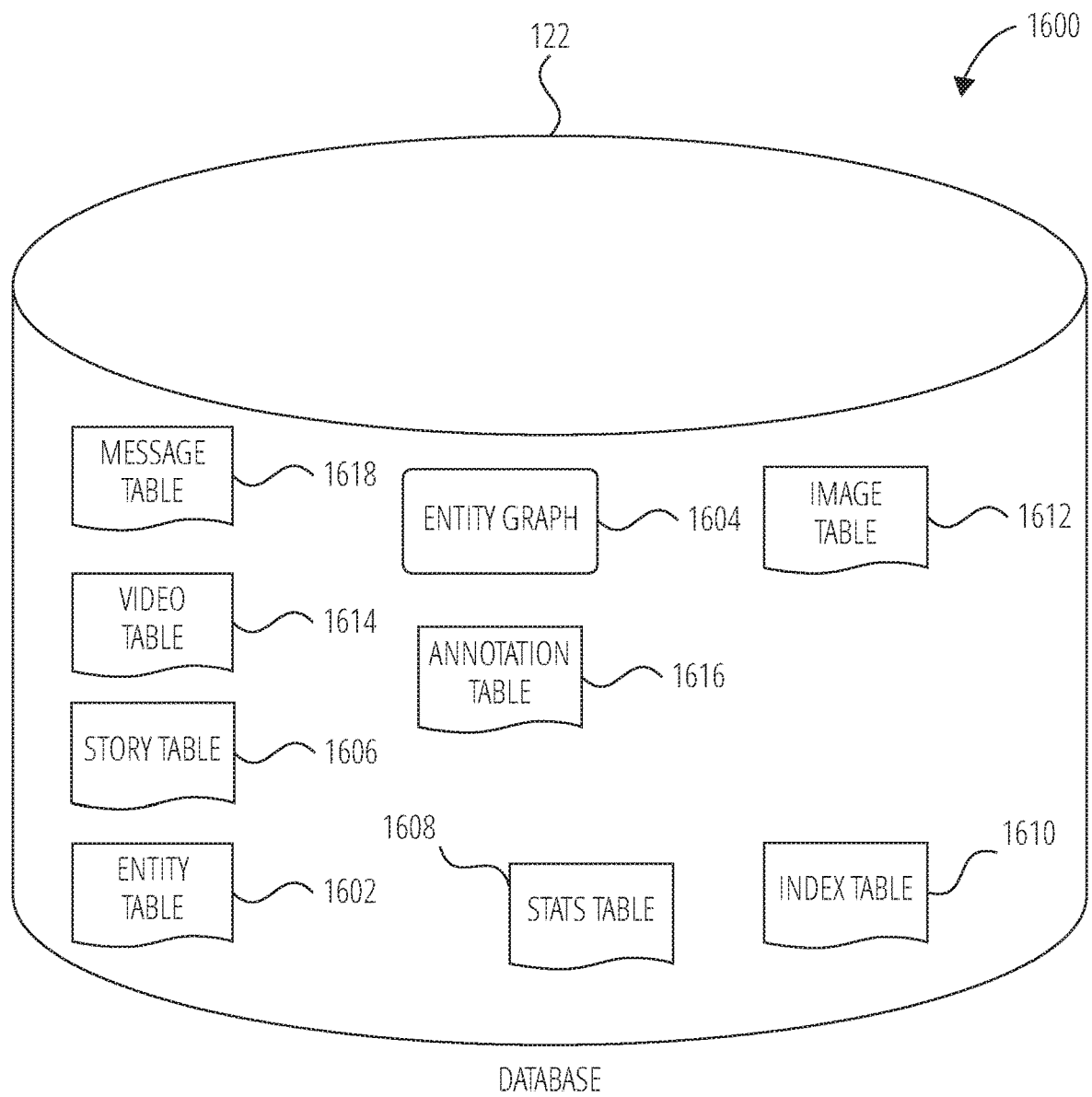
FIG. 16 is a diagrammatic representation of a data structure as maintained in a database, in accordance with some example embodiments.

The social network system 124 supports various social networking functions services, and makes these functions and services available to the messaging server application 116. To this end, the social network system 124 maintains and accesses an entity graph 1604 (as shown in FIG. 16) within the database 122. Examples of functions and services supported by the social network system 124 include the identification of other users of the messaging system 100 with which a particular user has relationships or is "following", and also the identification of other entities and interests of a particular user.

The log events reporting system 126 supports functions such as periodically receiving log events generated by client device 102, aggregating log events and populating the aggregated data into database 122 via database server 120, receiving queries from advertiser device 104 via application server 114, processing queries via database server 120, and providing results to advertiser device 104 via application server 114. Log events may include user interaction events, such as viewing, spending, and interactions, generated by user interactions with advertisements showing in client device 102.

The application server 114 is communicatively coupled to a database server 120, which facilitates access to a database 122 in which is stored data associated with messages processed by the messaging server application 116 and log events processed by log events reporting system 126.

Figure 2:
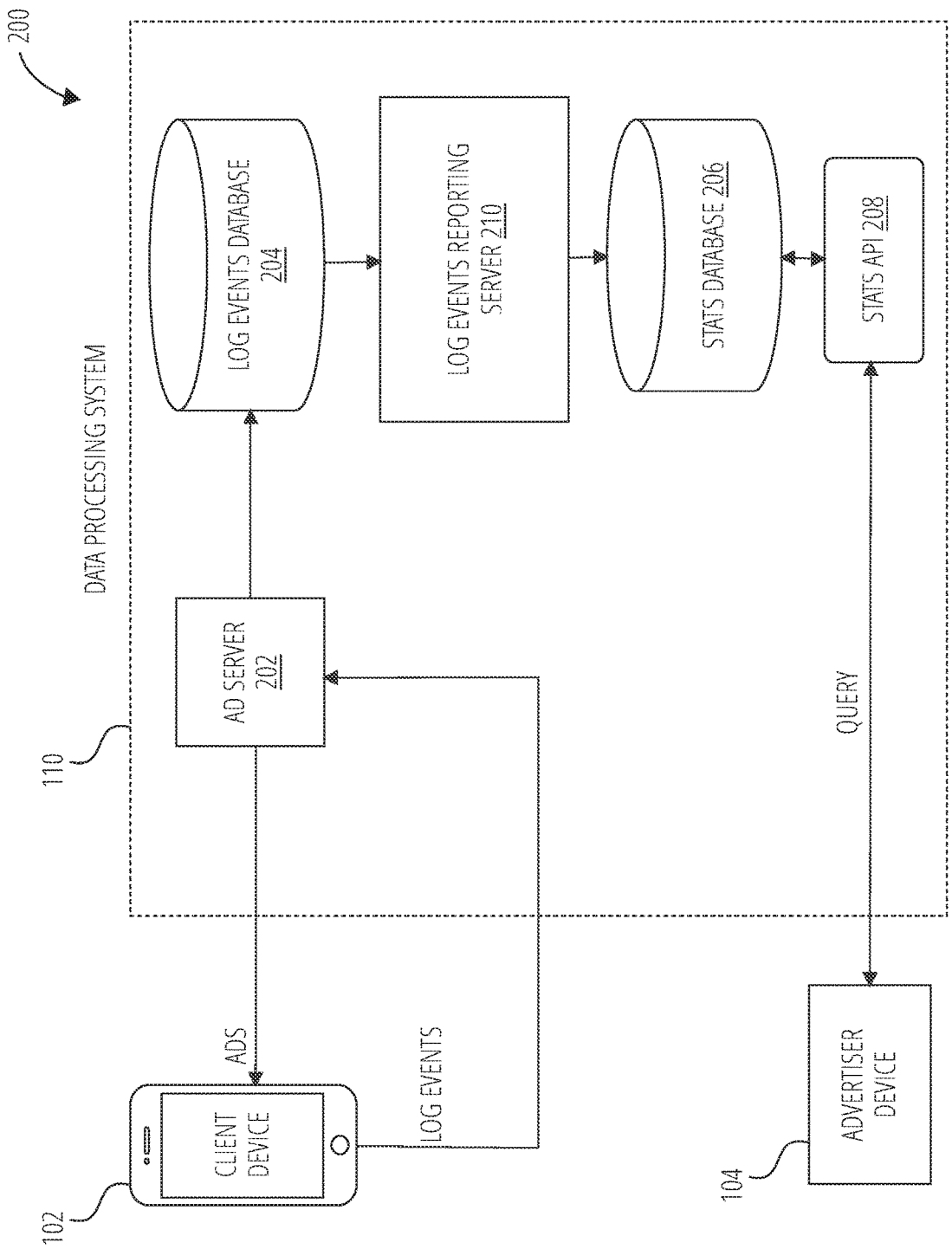
FIG. 2 illustrates a diagrammatic representation of further details of the data processing system of a network environment 200 in accordance with one embodiment.

FIG. 2 illustrates a diagrammatic representation of further details of the data processing system 110 of a network environment 200 in accordance with one embodiment. As shown in FIG. 2, the data processing system 110 can communicate with at least one client device 102 and at least one advertiser device 104. The data processing system 110 includes an ad server 202, a log events database 204, a log events reporting server 210, a stats database 206, and a stats API 208. In some embodiment, the log events reporting server 210 may reside in the log events reporting system 126. In one embodiment, the log events reporting system 126 in application server 114 in FIG. 1 comprises the ad server 202 and the log events reporting server 210. In one embodiment, the database 122 in FIG. 1 comprises the log events database 204 and the stats database 206. The stats database 206 can include a stats table 1608 and an index table 1610 as shown in FIG. 16. In one embodiment, the API server 112 in FIG. 1 comprises the stats API 208. In another embodiment, the database server 120 comprises the ad server 202.

In some embodiments, a key value store database comprises the stats table 1608 and the index table 1610. The ad server 202 delivers advertisements (or ads) to the client device 102. The ad server 202 can also cause the advertisements to be displayed on a display of the client device 102. Based on user interactions with the advertisements, client device 102 generates a series of log events. Each of the log events can be generated by the client device 102 at a predetermined time period, such as an hour, a day, a month, etc. Accordingly, a log event can be generated every hour, every day, every month, etc. As shown in FIG. 2, ad server 202 receives the log events from the client device 102 and stores the log events in log events database 204. The ad server 202 can also transmit the log events to the database server 120 (FIG. 1). In this embodiment, the database server 120 processes the log events and stores the log events in the log events database 204.

In one embodiment, log events reporting server 210 aggregates log events data based on each predetermined time period, and stores the aggregated data (e.g., aggregated log events) in the stats database 206. It is understood by persons of ordinary skills in the art that aggregating data refers to data being combined from several measurements. When data is aggregated, groups of observations are replaced with summary statistics based on those observations.

Figure 10:
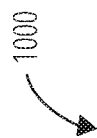
FIG. 10 illustrates an example of the stats table in a second data version (e.g., data version 2) in accordance with one embodiment.

Referring to FIG. 9-11. FIG. 9 illustrates an example of the stats table in a first data version (e.g., data version 1) in accordance with one embodiment; FIG. 10 illustrates an example of the stats table in a second data version (e.g., data version 2) in accordance with one embodiment; FIG. 11 illustrates an example of the stats table in a third data version (e.g., data version 3) in accordance with one embodiment. The stats table in the first data version can correspond to the first predetermined time period, the stats table in the second data version can corresponds to the second predetermined time period, and the stats table in the third data version can corresponds to the third predetermined time period.

At each of the predetermined time periods, as shown in FIG. 9-11, log events reporting server 210 writes data rows based on the aggregated log events in the stats table 1608. The data rows stored in the stats table 1608 comprise a first row key and a plurality of data labels. The plurality of data labels comprises counters which include the value of log events such as viewing, spending and interaction as the results of data aggregation by log events reporting server 210. Each log event in each row indicates the number of events occurred associated with each entity type, entity identity and each time stamp as indicated by the first row key. For example, in row 3 of FIG. 9, the first row indicates ad1 had 1000 viewing, $5 of spending, and 100 interactions with users within the first predetermined time period (e.g., the first hour).

The log events reporting server 210 can also aggregates log events data based on each predetermined time period and stores the aggregated data via the database server 120 (FIG. 1). In some embodiments, the stats database 206 can include a stats table 1608 and an index table 1610.

According to some embodiments, at least one advertiser device 104 generates a query and transmits the query to a stats API 208. In some embodiments, stats API 208 may be a Representational State Transfer (REST) API. In one embodiment, stats API 208 transmits the query to the database server 120 for processing. Database server 120 can retrieve and read the data from stats database 206 corresponding to the query, and generates results based on the data corresponding to the query. In some embodiments, the log events reporting ad server 202 generates the results based on the data corresponding to the query in the stats database 206. In one embodiment, the results include the data corresponding to the query in the stats database 206. The database server 120 (or log events reporting server 210) can return the results to stats API 212. Stats API 212 receives the results and transmits the results to the advertiser device 104.

In some embodiments, the advertiser device 104 can transmit a query to the data processing system 110 at any time. For example, the advertiser device 104 can transmit the query while the log events reporting server 210 is writing data rows based on aggregated data stored in the stats table 1608 in the stats database 206.

While not shown, it is understood that the client device 102 and the advertiser device 104 can be communicatively coupled to the data processing system 110 in FIG. 2 via the network 106 in FIG. 1.

Figures 3A, 3B:
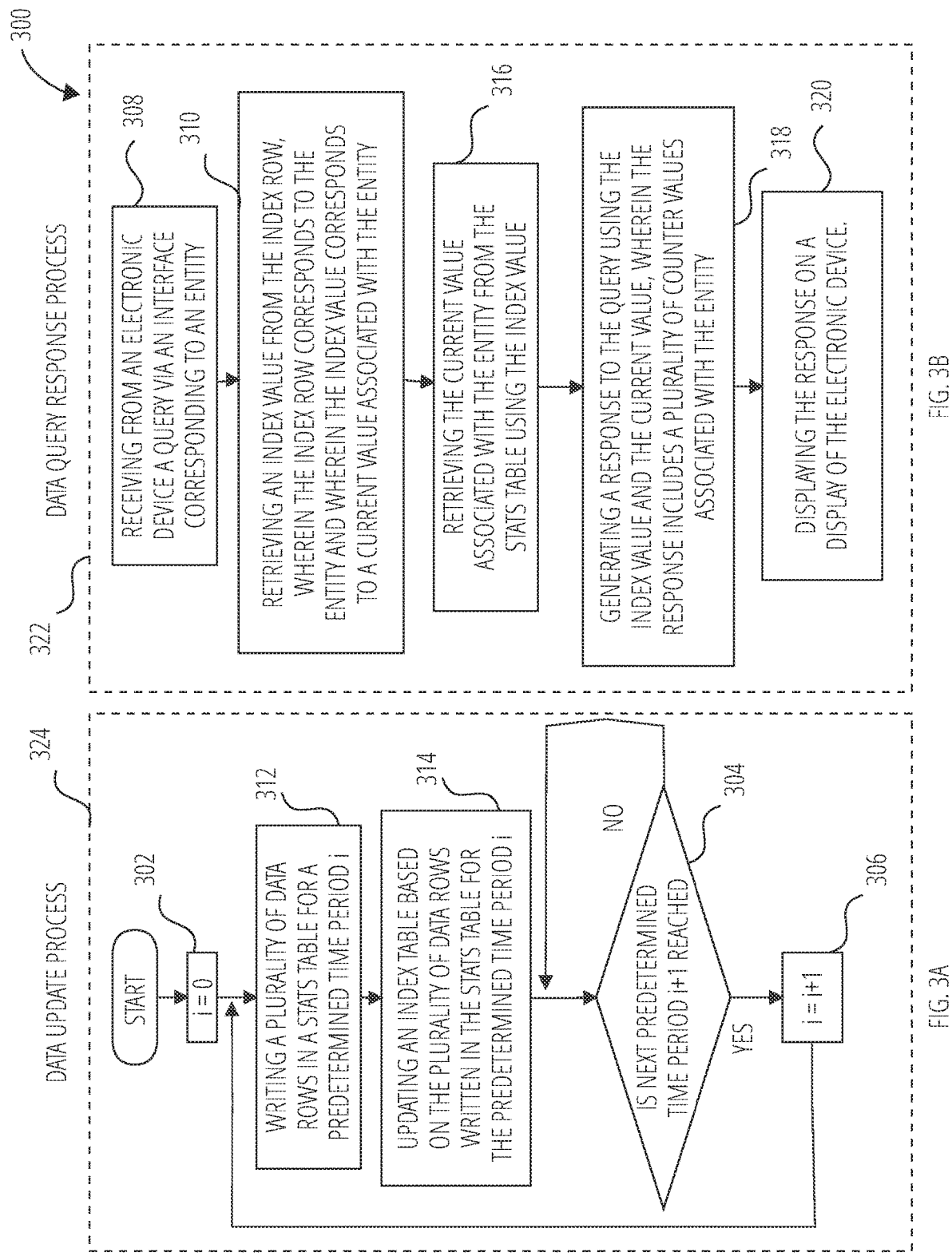
FIG. 3A-3B illustrate flow diagrams of processes in accordance with one embodiment.

FIG. 3A is a flow diagram 300 of a data update process 324 in accordance with one embodiment, and FIG. 3B is a flow diagram of a data query response process 322 according to some example embodiments.

By implementing both the data update process 324 and the data query response process 322, the data processing system 110 in the networked environment 200 can implement a cross row consistent data accessing. For illustrative purposes, the processes 324 and 322 are described with respect to the data processing system 110 in the networked environment 200 in FIG. 2. It is to be understood that the processes 324 and 322 may be practiced with other system configurations in other embodiments. For example, the processes 324 and 322 can be performed by a processor. In one embodiment, the data processing system 110 can perform the data update process 324 and data query response process 322 concurrently or sequentially.

Referring to the data update process 324 in FIG. 3A, the data processing system 110 starts, at operation 302, by initializing an index i. For example, the index i can be set to 0 as shown in FIG. 3A (e.g., i=0). At operation 312, the data processing system 110 can write a plurality of data rows in a stats table 1608 for predetermined time period i. For example, in the first iteration after the initialization at operation 302, the predetermined time period i is the first predetermined time period 0. The predetermined time period can be an hour, a day, a month, a year, etc. Accordingly, when the predetermined time period set as an hour, at operation 312, the data processing system 110 can write a plurality of data rows in the stats table 1608 that correspond to the predetermined time period i (e.g., hour i). Referring to FIG. 9, an example of the written plurality of data rows in the stats table 1608 for the first predetermined time period 0 is shown. As shown in FIG. 9, the data rows stored in the stats table 1608 comprise a first row key and a plurality of data labels. The plurality of data labels comprises counters which include the value of log events such as viewing, spending and interaction.

Figure 4:
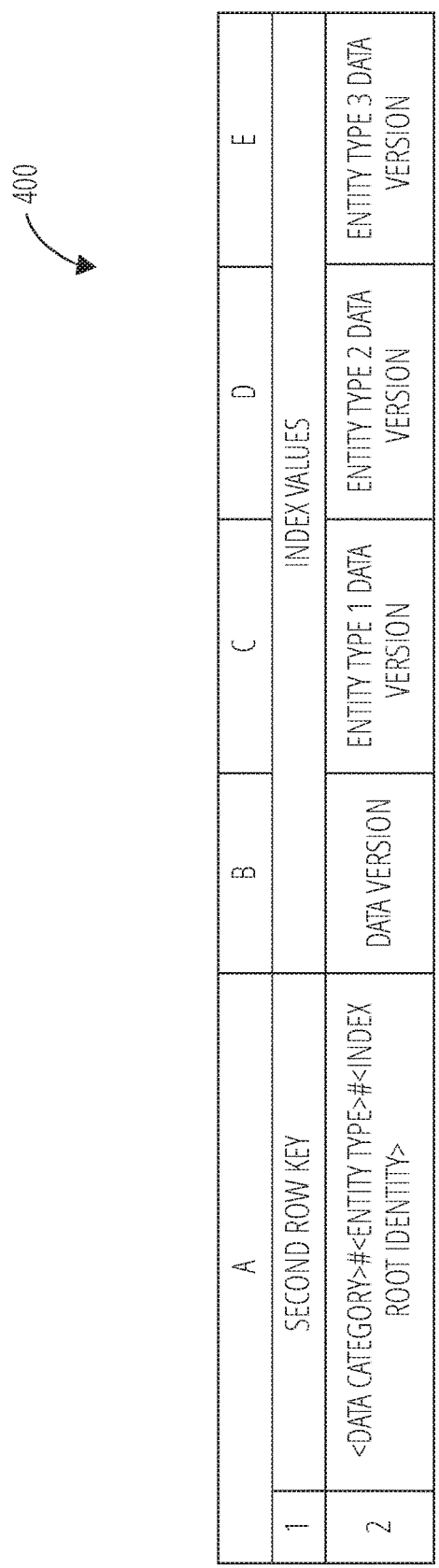
FIG. 4 illustrates an example of an index table in accordance with one embodiment.

At operation 314, the data processing system 110 updates an index table 1610 based on the plurality of data rows written in the stats table 1608 for the predetermined time period i. For example, FIG. 4-5 illustrate examples of the index table 1610. As shown in FIG. 5, the index table 1610 can include a current version data of each of the entities in the stats table in a single row (index row). Accordingly, the index row in the index table 1610 can be referred to, at any given time, to provide the current version data. Specifically, the index row include data (e.g., index value) that comprise pointers used to fetch queried entities value from the stats table 1608. For example, the single index row included in the index table 1610 can be row 3 as shown in FIG. 5. It is understood that the row 1 and the row 2 as shown in FIG. 5 merely provide labels and explanations regarding the contents of the single index row (row 3) and are included herein for illustration purpose only.

At operation 304, the data processing system 110 determines whether the next predetermined time period (i+1) is reached. In the example where the predetermined time period is an hour, the next predetermined time period (i+1) is reached when the predetermined time period i (e.g., hour i) is lapsed. In other words, the next predetermined time period i+1 (e.g., next hour) is reached. If the data processing system 110 determines that the next predetermined time period i+1 is not reached, the data processing system 110 waits and repeats the operation 304 until the next predetermined time period i+1 is reached.

If the data processing system 110 determines that the next predetermined time period (i+1) is reached, the data processing system 110 increases the index i at operation 306 (e.g., i=i+1) and performs operation 312 having updated the predetermined time period.

In some embodiment, since key value stores can be non-relational databases that only guarantee single row atomic transaction, the index row in the index table 1610 can be referred to, at any given time, to provide the current version data. Specifically, given that the index row is one single row and a consistent data read is a guaranteed single row atomic transaction, the index row can include data acting as pointers to fetch queried entities value from the stats table 1608. This allows for the data read to be complete and consistent at any given time that there is a query. Particularly, the index table 1610 provides for complete and consistent data reads during data update process 324.

Referring to the data query response process 322 in FIG. 3B, the data processing system 110 can start by receiving at operation 308 from an electronic device, via an interface, a query corresponding to an entity. In one embodiment, the query includes an identification of the entity. An entity can be, for example, a single advertisement (e.g., ad 1, in FIG. 9-11), an advertising squad (e.g., squad 1, in FIG. 9-11), an advertising campaign (e.g., campaign 1, in FIG. 9-11), or an advertiser account (e.g., account 1, in FIG. 9-11). The advertiser account can be associated with a plurality of single advertisements, squads, campaigns.

Figure 7:
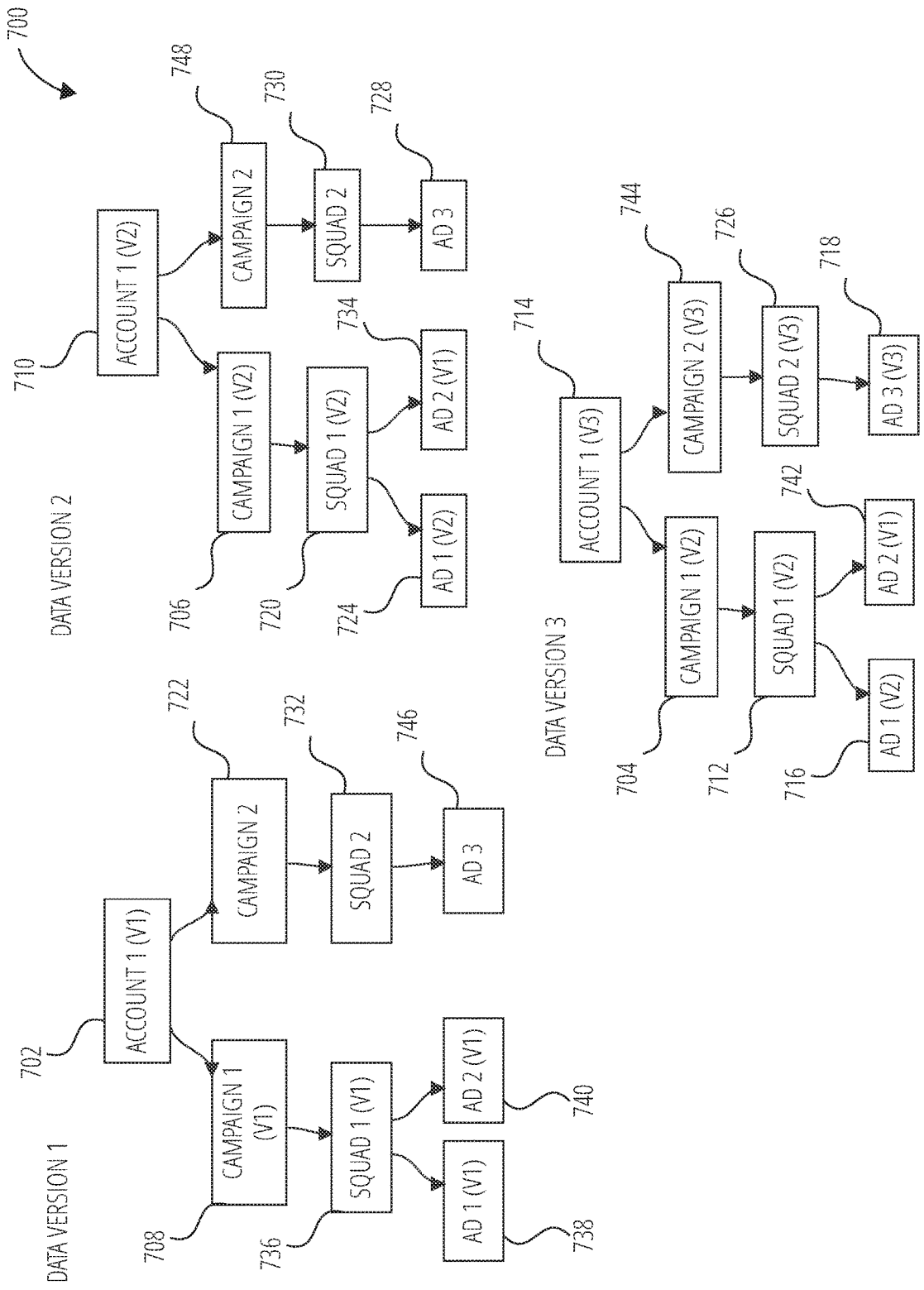
FIG. 7 illustrates an example of index tree in three version stages in accordance with one embodiment.

For example, in FIG. 7, an advertiser device 104 may operates multiple advertiser accounts that associated with a plurality of advertising campaigns, advertising squads, and advertisement associated under each advertiser accounts. An advertisement (e.g., ad 1 (v1) 738) may be an advertisement shown on an electronic device viewed by a user. An advertising squad (e.g., squad 1 (v1) 736) can be a collection of advertisements. An advertising campaign (e.g., campaign 1 (v1) 708) can be a collection of advertising squads that comprise a collection of advertisements. An advertiser account (e.g., account 1 (v1) 702) can be a collection of advertising campaigns that comprise a collection of advertising squads that comprise a collection of advertisements, etc.

According to some embodiments as shown in FIG. 7, a first advertising squad (e.g., squad 1) is associated with a first advertisement (e.g., ad 1) and a second advertisement (e.g., ad 2). A second advertising squad (e.g., squad 2) is associated with a third advertisement (e.g., ad 3). A first advertising campaign (e.g., campaign 1) is associated with the first advertising squad (e.g., squad 1). A second advertising campaign (e.g., campaign 2) is associated with the second advertising squad (e.g., squad 2). An advertiser account (e.g., account 1) is associated with the first advertising campaign (e.g., campaign 1) and the second advertising campaign (e.g., campaign 2). An advertiser device 104 may operates multiple advertiser accounts that associated with a plurality of advertising campaigns, advertising squads, and advertisement associated under each advertiser accounts.

At operation 310, the data processing system 110 retrieves an index value from an index row in the index table 1610. In one embodiment, the data processing system 110 retrieves the index value from the index row that corresponds to a current value associated with the entity. As discussed above, the index table 1610 can include a current version data of each of the entities in the stats table in a single row (index row). The index row can be referred to, at any given time, to provide the current version data. Specifically, the index row includes data (e.g., index value) that comprise pointers used to fetch queried entities value from the stats table 1608.

In this embodiment, the data processing system 110 retrieves the index value that corresponds to a current value associated with the entity identified in the query. The data processing system 110 then retrieves at operation 316 the current value from the stats table using the index value.

At operation 318, the data processing system 110 generates a response to the query using the index value and the current value. The response can include a plurality of counter values associated with the entity. As shown in FIG. 9-11, the counter values can include a number of viewings of the entity, an amount spent corresponding to the entity, a number of interactions with the entity, etc.

For example, when the entity identified in the query is advertisement 1 (e.g., ad 1) and the index version identified in the index row is V1 (e.g., FIG. 5), the counter values can include a number of viewings of the entity (e.g., 1000 viewings of ad 1), an amount spent corresponding to the entity (e.g., $5 spent on ad 1), a number of interactions with the entity (e.g., 100 interactions with ad 1), as shown in FIG. 9-11.

At operation 320, the data processing system 110 causes the response to be displayed on a display of the electronic device.

FIG. 4 illustrates an example of an index table in accordance with an embodiment. The index table 400 comprises one index row in row 2. The index row comprises a second row key and a set of index values. The second row key comprises a data category, an entity type, and an index root identity. The data category may be a type of data where only the latest version of the data has value, such as lifetime data.

An entity types may refer to an account, a campaign, a squad, or an ad. An index root identity may refer to the identity of the root node of an index tree data structure which is discussed in FIG. 6.

The set of index values may include index version (e.g., timestamp) of the index root identity, and the data versions of each entity types. The data version may refer to the time stamp of each predetermined time period according to some embodiments.

FIG. 5 illustrates an example of an index table in accordance with an embodiment. The index row in FIG. 5 is row 3 which shows the second row key and the set of index values in index version 1, such as in time stamp 1 as in hour 1 in some embodiments. The second row key comprises lifetime as the data category, account as the entity type, and account id as the index root identity. The set of index values comprises hour 1 as the index version of the index root identity showing as account, and each pointer map<id, version> pointing to the respective versions of campaign, squad, and ad as the entity types other than the root entity as account. The pointers are used to fetch the entities value from the stats table 1608 requested by the query which may come in at any given time according to some embodiments.

Figure 6:
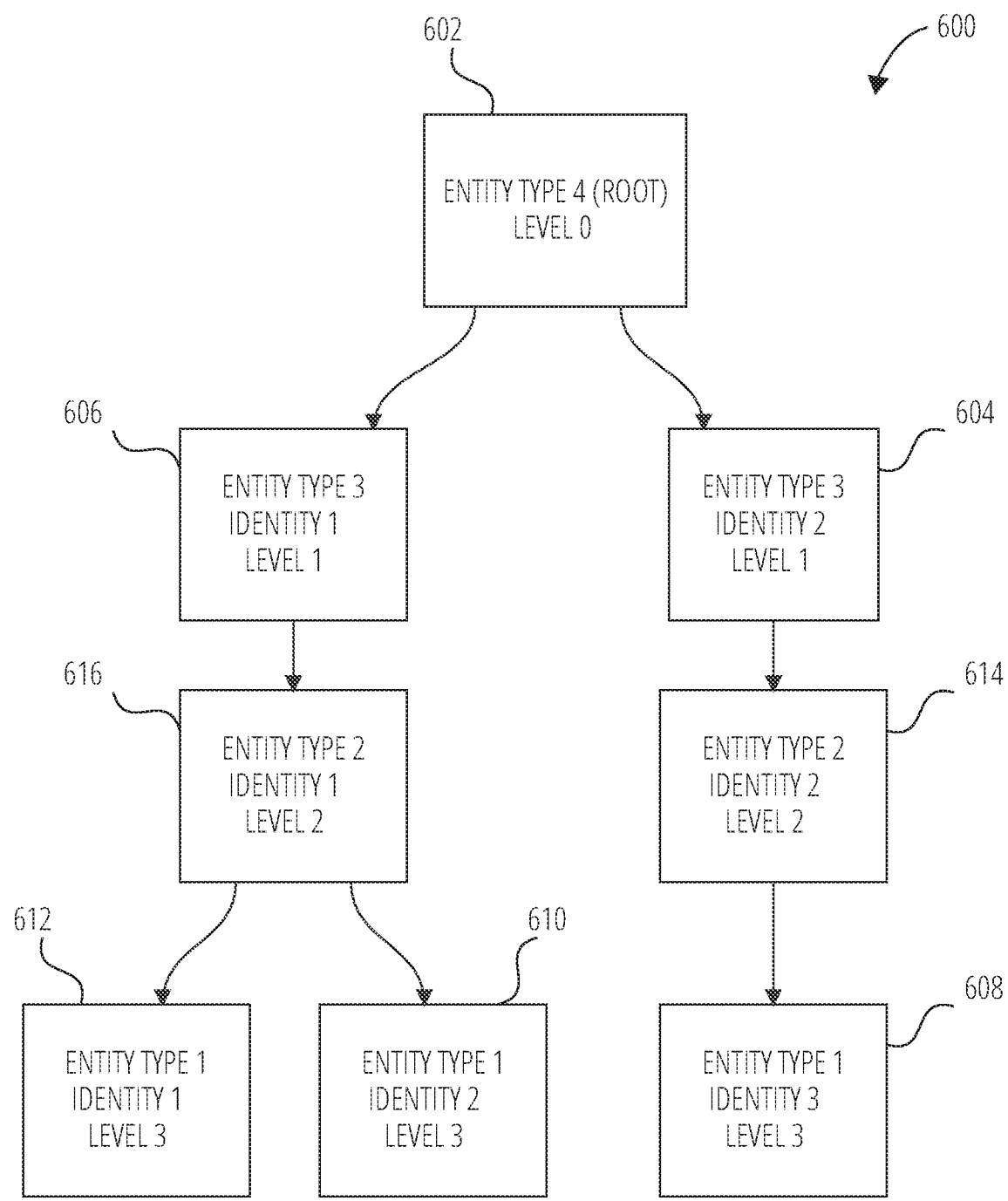
FIG. 6 illustrates a block diagram of an example of an index tree in accordance with one embodiment.

FIG. 6 illustrates a block diagram showing an index tree 600 in accordance with an embodiment. The index row is constructed based on the index tree comprising a root node as entity type 4 in level 0 (block 602), two entity type 3 intermediate level nodes in level 1 (block 606 and block 604), two entity type 2 lower level nodes in level 2 (block 616 and block 614), and three entity type 1 leaf nodes in level 3 (block 612, block 610, and block 608).

In some embodiments, it is understood by persons of ordinary skills in the art that each node, except for nodes in the lowest level (e.g., leaf nodes), has a key information referencing to one or more nodes in the immediate lower level nodes. For example, the root node entity type 4 level o (block 602) has a key information referencing to nodes entity type 3 identity 1 level 1 (block 606) and entity type 3 identity 2 level 1 (block 604). The key information can be version attributes of the one or more nodes in the immediate lower level, so that once a leaf node updates to a new version, all upper nodes in the same branch updates to the new version.

FIG. 7 illustrates an example of index tree in three version stages in accordance with an embodiment. In a predetermined time period, such as version 1 or the first hour, ad 1 and ad 2 are active due to occurrence of certain user interactions, such as the user viewed, interacted, or made spending on an advertisement 1 (ad 1) and advertisement 2 (ad 2) sent by the ad server 202 onto the client device 102. The index version of ad 1 and ad 2 thereby changes to V1, indicating both entities were active in the first hour. Since squad 1, campaign 1 and account 1 are the upper nodes referring to respective lower nodes with the same version attributes, the index version of squad 1, campaign 1 and account 1 changes to V1 as well. Because ad 3 were inactive in the first hour, therefore there is no index version assigned to ad 3 and its upper level nodes including squad 2 and campaign 2.

According to some embodiments, in a subsequent predetermined time period, such as version 2, or the second hour, ad 1 is active due to user interactions with advertisement 3. As explained above, the index version of its upper nodes including squad 1, campaign 1 and account 1 change to V2. In the second hour, ad 2 is inactive, hence its index version remains V1. Ad 3 remains inactive. Therefore, no index version is assigned.

According to some embodiments, in a next subsequent predetermined time period, such as version 3, or the third hour, ad 1 and ad 2 are inactive, but ad 3 is active, therefore index version V3 is assigned to ad 3 and squad 2, campaign 2 and account 1.

According to some embodiments, the index version is incorporated into the index values of the index row shown in FIG. 4-5.

FIG. 8 illustrates an example of a stats table 1608 in accordance with one embodiment. Each data rows in the first data table 800 comprises a first row key and a plurality of data labels. The first row key comprises an entity type, an entity identity and a data version. The entity types may include account, campaign, squad, and ad. Each entity within each entity type may be identified by entity identity, such as campaign 1, campaign 2, squad 1, squad 2, etc.

The data version may be time stamp in some embodiment. The data version may reflect each predetermined time period, for example, when a predetermined time period is one hour, data version of the first hour is labeled as V1 and the data version of the second hour is labeled as V2, etc. The plurality of data labels may comprise metrics, such as counters associated with each log events (e.g. viewing, spending, and interaction) as illustrated in FIG. 9-FIG. 11.

FIG. 9 illustrates an example of the stats table in a first data version (e.g., data version 1 or V1) in accordance with one embodiment. The plurality of data labels comprises counters which include the value of log events such as viewing, spending and interaction as the results of data aggregation by log events reporting server 210. Each log event in each row indicates the number of events occurred associated with each entity type, entity identity and each time stamp as indicated by the first row key. For example, in row 3, the first row indicates ad1 had 1000 viewing, $5 of spending, and 100 interactions with users within the first predetermined time period, such as the first hour.

Referring back to the FIG. 7, the index tree is updated as shown in the data version 1 after the first data table is populated with the data rows 3-11 shown in FIG. 9 where the data rows record all the aggregated log events associated with the entities active in the first hour, such as, ad1, ad2, and their respective upper level entities such as squad 1, campaign 1 and account 1 based on the same version attributes.

FIG. 10 illustrates an example of the stats table in a second data version (e.g., data version 2 or V2) in accordance with one embodiment. The index tree is updated as shown in data version 2 in FIG. 7 after the first data table is populated with data rows 4, 7, 9 and 11 recording all aggregated log events associated with the entities active in the second hour, including ad2 and its upper level entities squad 1, campaign 1 and account 1 based on the same version attributes.

FIG. 11 illustrates an example of the stats table in a third data version (e.g., data version 3 or V3) in accordance with one embodiment. The index tree is updated as shown in data version 3 in FIG. 7 after the stats table is populated with data rows 6, 9, 12, 15 recording all aggregated log events associated with the entities active in the third hour, including ad3 and its upper level entities squad 2, campaign 2 and account 1 based on the same version attributes.

Figure 12:
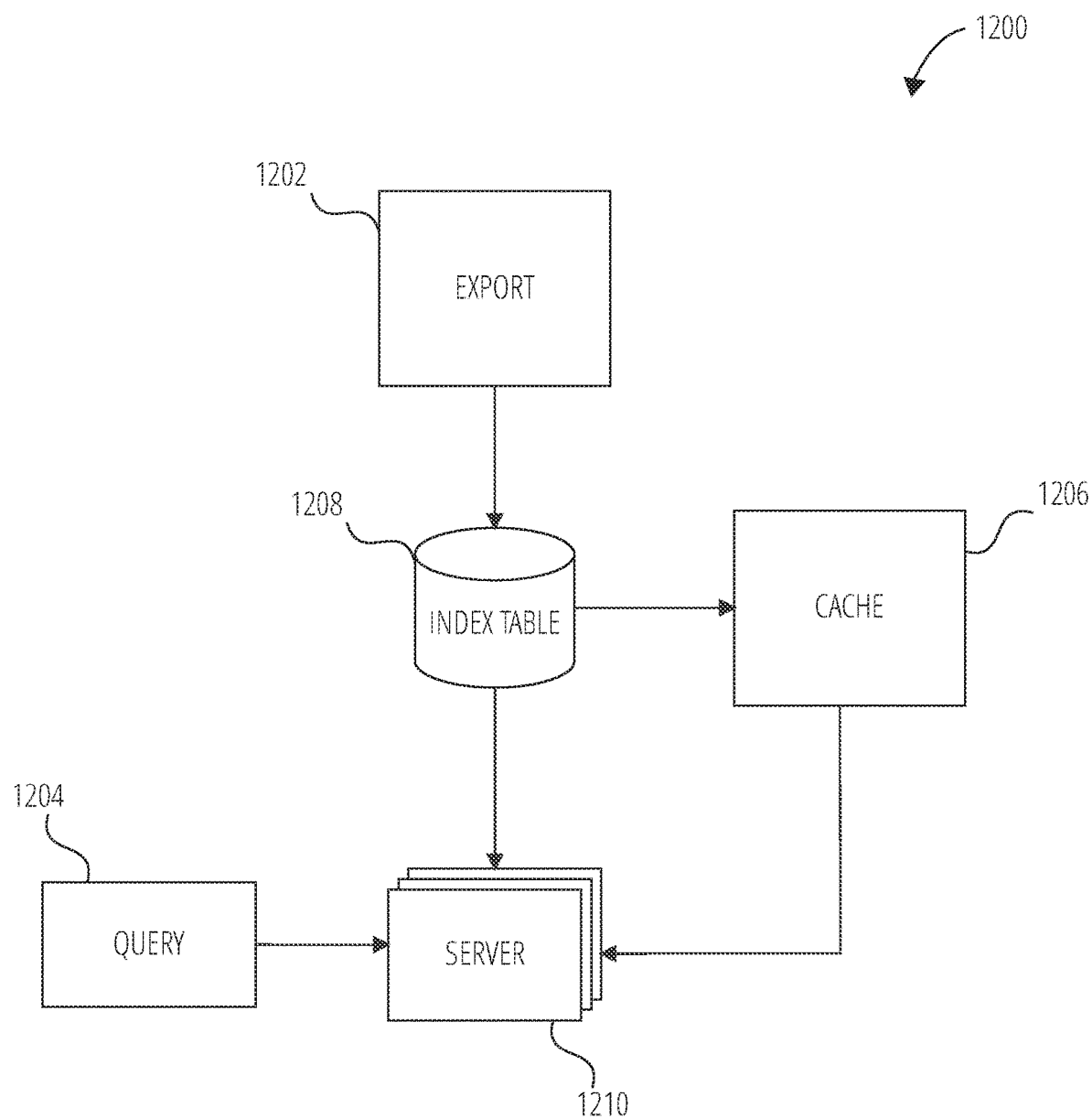
FIG. 12 illustrates a block diagram of the data processing system caching index data in accordance with one embodiment.

FIG. 12 illustrates a block diagram of the data processing system caching index data in accordance with one embodiment. Based on each predetermined time period, such as hourly, aggregated data of log events is exported (block 1202) in the index table 1208. The index table 1208 asyncs with the cache 1206 and loads the index table 1208 into the cache 1206 periodically, such as in every 15 minutes. Subsequently when a query 1204 is received by server 1210, the server 1210 may access the index table 1208 directly from the cache 1206 instead of having to reload the index table 1208 to the server 1210 again. The data processing system caching index data helps to improve the performance and scalability of data read, and further improve query efficiency.

In some embodiments, a query 1204 is sent by advertiser device 104 and received by database server 120 or ad server 202. In some embodiments, the stats database 206 comprises the index table 1208. In some embodiments, database server 120 comprises server 1210.

Figure 13:
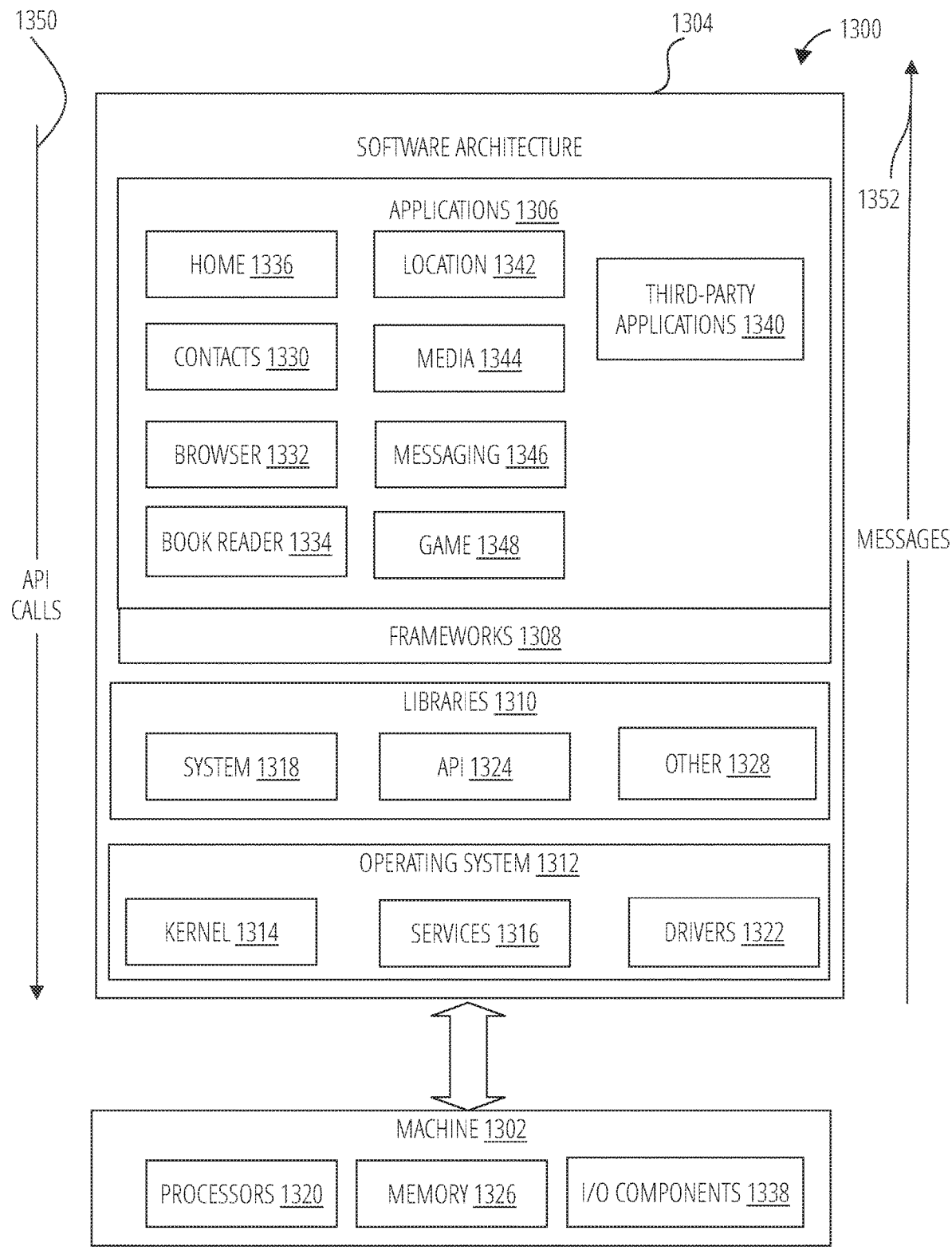
FIG. 13 is block diagram showing a software architecture within which the present disclosure may be implemented, in accordance with some example embodiments.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers). WI-FI® drivers, audio drivers, power management drivers, and so forth.

The libraries 1310 provide a low-level common infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a high-level common infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example embodiment, the applications 1306 may include a home application 1336, a contacts application 1330, a browser application 1332, a book reader application 1334, a location application 1342, a media application 1344, a messaging application 1346, a game application 1348, and a broad assortment of other applications such as third-party applications 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party applications 1340 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1340 can invoke the API calls 1350 provided by the operating system 1312 to facilitate functionality described herein.

Figure 14:
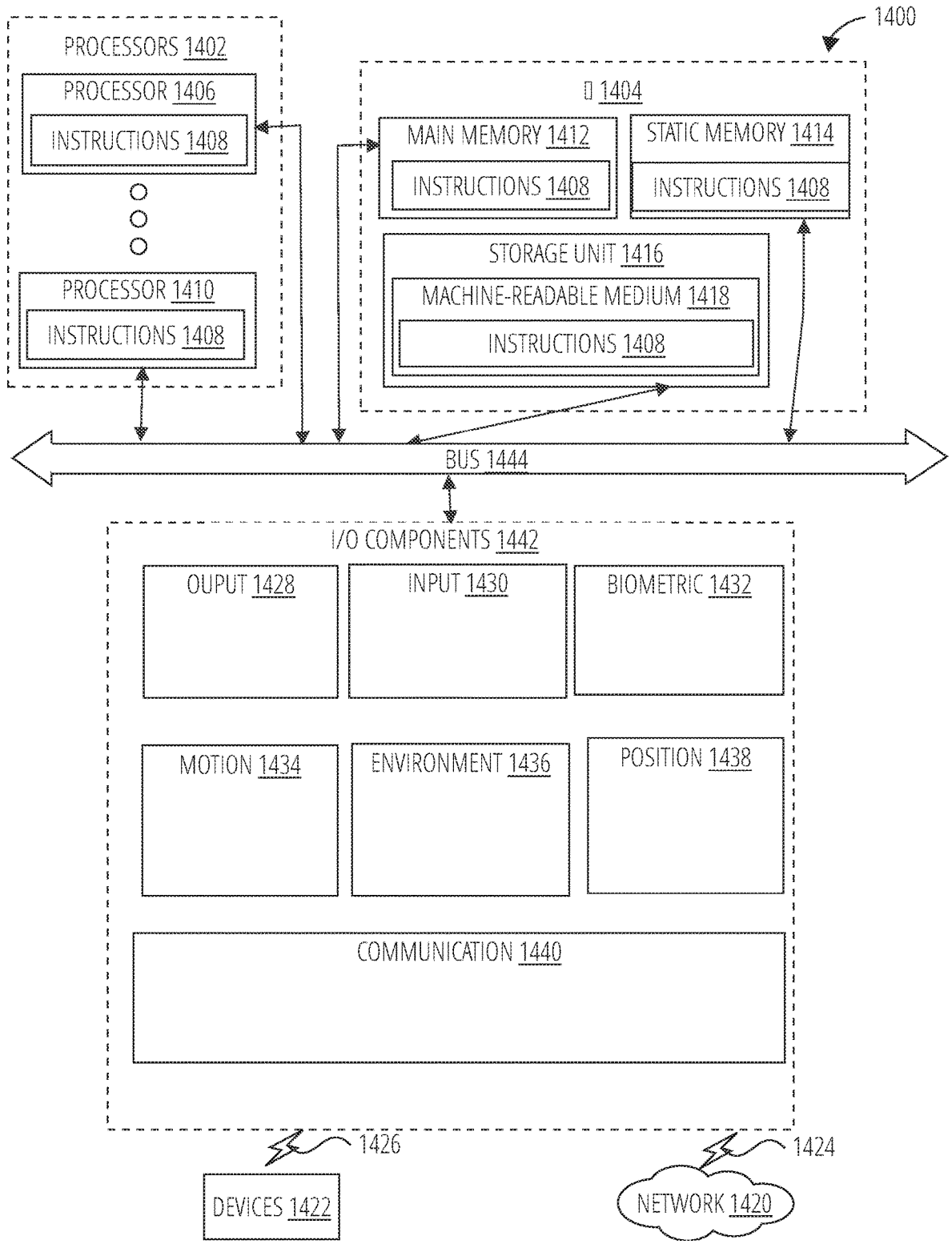
FIG. 14 is a diagrammatic representation of a machine, in the form of a computer system within which a set of instructions may be executed for causing the machine to perform any one or more of the methodologies discussed, in accordance with some example embodiments.

FIG. 14 is a diagrammatic representation of a machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include processors 1402, memory 1404, and I/O components 1442, which may communicate with each other via a bus 1444. In an example embodiment, the processors 1402 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1406 and a processor 1410 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, both accessible to the processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the processor's cache memory), or any suitable combination thereof, during execution thereof by the machine 1400.

The I/O components 1442 may include a wide variety of components to receive input, provide output, produce output, transmit information, exchange information, capture measurements, and so on. The specific I/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other components that are not shown in FIG. 14. In various example embodiments, the I/O components 1442 may include output components 1428 and input components 1430. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1430 may include alphanumeric input components (e.g., a keyboard, a touch screen receiving alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1442 may include biometric components 1432, motion components 1434, environmental components 1436, or position components 1438, among a wide array of other components. For example, the biometric components 1432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 include acceleration sensor components (e.g., accelerometer), gravitation sensor components, rotation sensor components (e.g., gyroscope), and so forth. The environmental components 1436 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1442 further include communication components 1440 operable to couple the machine 1400 to a network 1420 or devices 1422 via a coupling 1424 and a coupling 1426, respectively. For example, the communication components 1440 may include a network interface component or another suitable device to interface with the network 1420. In further examples, the communication components 1440 may include wired communication components, wireless communication components, cellular communication components. Near Field Communication (NFC) components, Bluetooth® components (e.g., Bluetooth® Low Energy). Wi-Fi® components, and other communication components to provide communication via other modalities. The devices 1422 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix. Dataglyph, MaxiCode, PDF417, Ultra Code. UCC RSS-2D bar code, and other optical codes), or acoustic detection components (e.g., microphones to identify tagged audio signals). In addition, a variety of information may be derived via the communication components 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface component included in the communication components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

Figure 15:
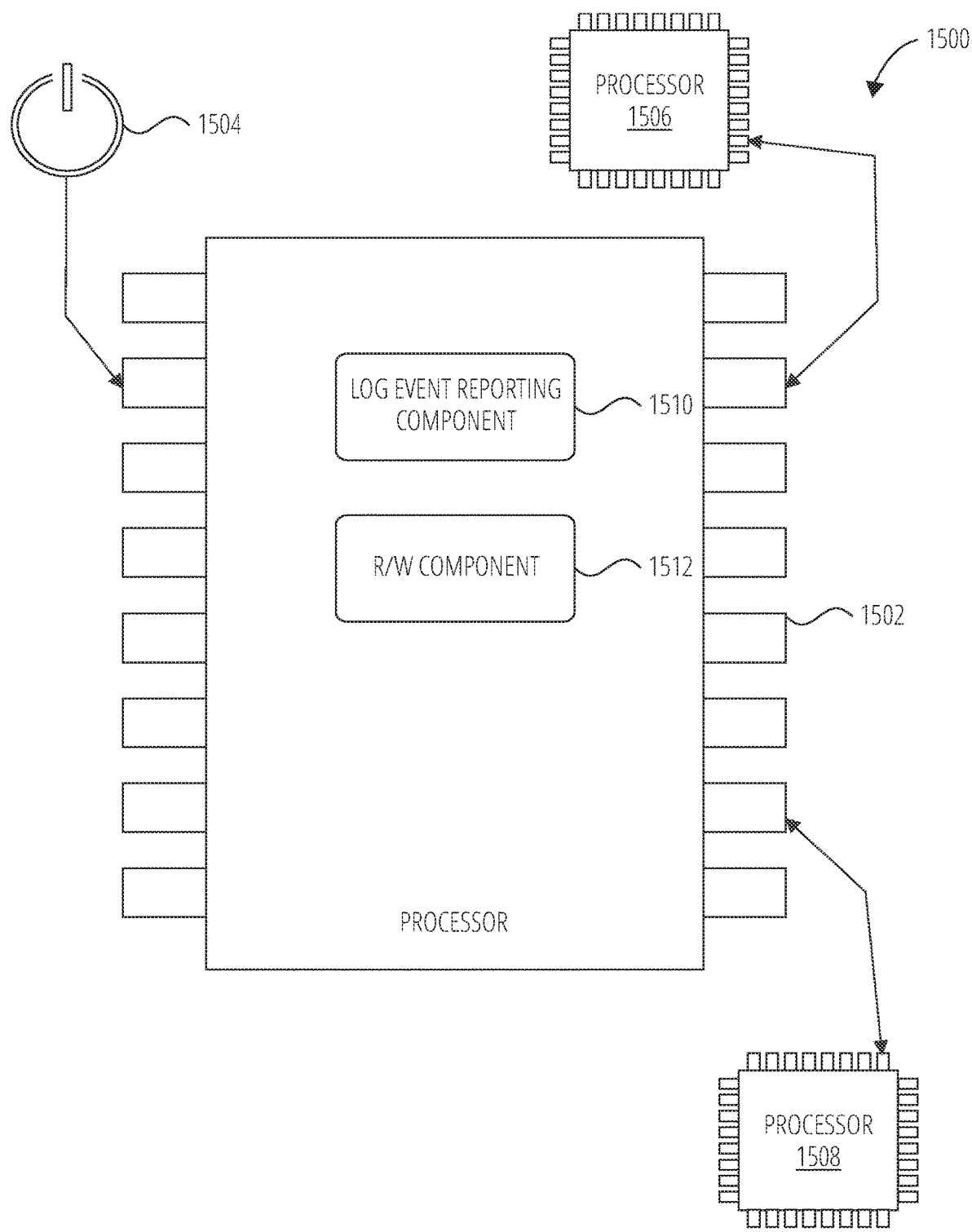
FIG. 15 is a diagrammatic representation of a processing environment, in accordance with some example embodiments.

FIG. 15 shows a diagrammatic representation of a processing environment 1500, which includes the processor 1506, the processor 1508, and a processor 1502 (e.g., a GPU. CPU or combination thereof).

The processor 1502 is shown to be coupled to a power source 1504, and to include (either permanently configured or temporarily instantiated) modules, namely a log event reporting component 1510, and an R/W component 1512. The log event reporting component 1510 operationally generates data such as aggregated data (e.g., aggregated log events) to populate the stats table 1608 and index data to update index table 1610, and the R/W component 1512 operationally generates data such as entities value based on query. As illustrated, the processor 1502 is communicatively coupled to both the processor 1506 and processor 1508, and receives query from the processor 1506, as well as log events based on each predetermined time period from the processor 1508.

FIG. 16 is a schematic diagram illustrating data structures 1600 which may be stored in the database 122 of the data processing system 110, according to certain example embodiments. While the content of the database 122 is shown to comprise a number of tables, it will be appreciated that the data could be stored in other types of data structures (e.g., as an object-oriented database).

The database 122 includes message data stored within a message table 1618. The entity table 1602 stores entity data, including an entity graph 1604. Entities for which records are maintained within the entity table 1602 may include individuals, corporate entities, organizations, objects, places, events, etc. Regardless of type, any entity regarding which the data processing system 110 stores data may be a recognized entity. Each entity is provided with a unique identifier, as well as an entity type identifier (not shown).

The entity graph 1604 furthermore stores information regarding relationships and associations between entities. Such relationships may be social, professional (e.g., work at a common corporation or organization) interested-based or activity-based, merely for example.

The database 122 also stores annotation data, in the example form of filters, in an annotation table 1616. Filters for which data is stored within the annotation table 1616 are associated with and applied to videos (for which data is stored in a video table 1614) and images (for which data is stored in an image table 1612). Filters, in one example, are overlays that are displayed as overlaid on an image or video during presentation to a recipient user. Filters may be of varies types, including user-selected filters from a gallery of filters presented to a sending user by the messaging client application 108 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 108, based on geolocation information determined by a GPS unit of the client device 102. Another type of filer is a data filer, which may be selectively presented to a sending user by the messaging client application 108, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 1612 is so-called "Lenses" data. "Lenses" may be a real-time special effect and sound that may be added to an image or a video.

As mentioned above, the video table 1614 stores video data which, in one embodiment, is associated with messages for which records are maintained within the message table 1618. Similarly, the image table 1612 stores image data associated with messages for which message data is stored in the entity table 1602. The entity table 1602 may associate various annotations from the annotation table 1616 with various images and videos stored in the image table 1612 and the video table 1614.

A story table 1606 stores data regarding collections of messages and associated image, video, or audio data, which are compiled into a collection (e.g., a story or a gallery). The creation of a particular collection may be initiated by a particular user (e.g., each user for which a record is maintained in the entity table 1602). A user may create a "personal story" in the form of a collection of content that has been created and sent/broadcast by that user. To this end, the user interface of the messaging client application 108 may include an icon that is user-selectable to allow a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 108, to contribute content to a particular live story. The live story may be identified to the user by the messaging client application 108, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 17:
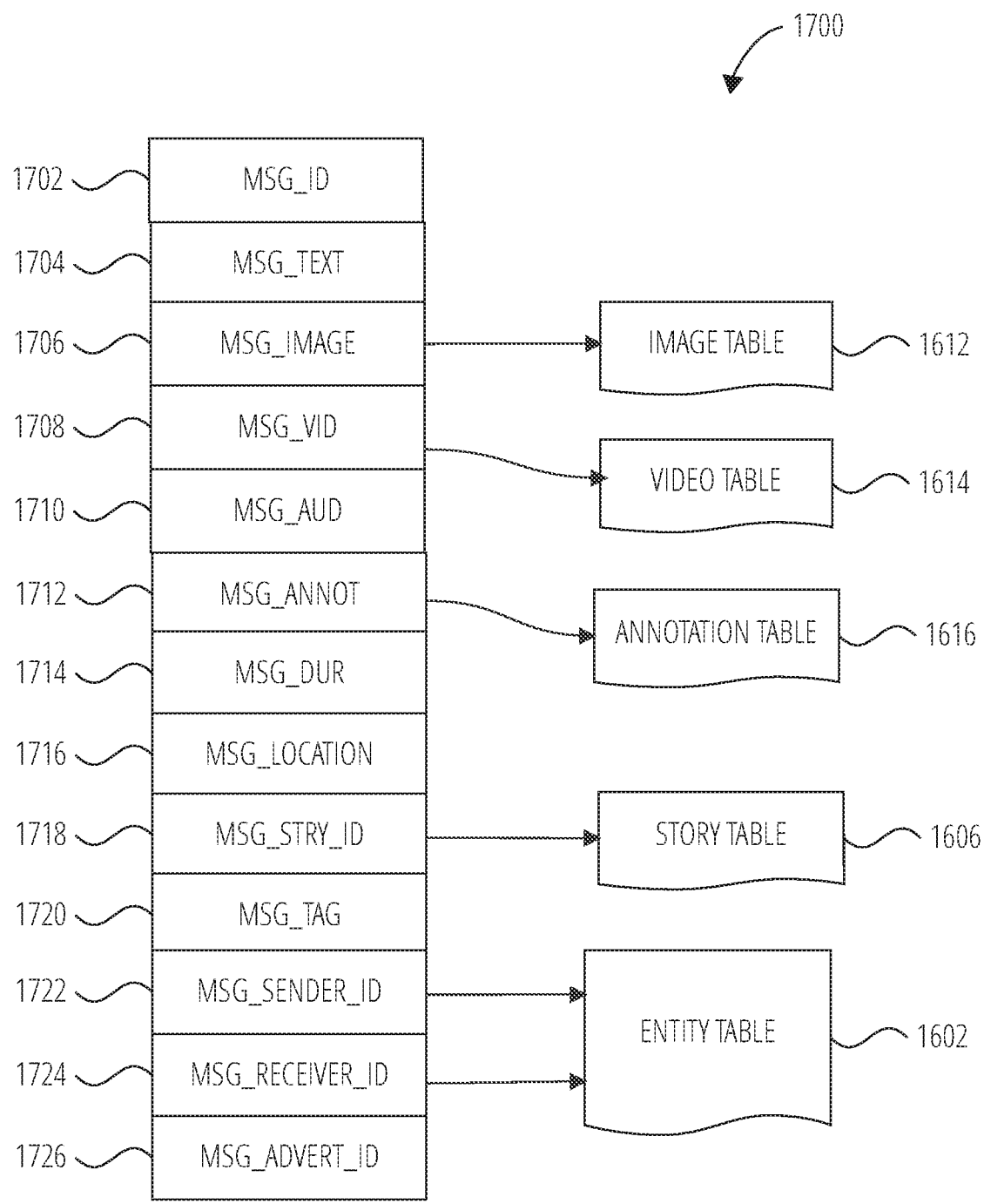
FIG. 17 is a diagrammatic representation of a message, in accordance with some example embodiments.

FIG. 17 is a schematic diagram illustrating a structure of a message 1700, according to some in some embodiments, generated by a messaging client application 108 for communication to a further messaging client application 108 or the messaging server application 116. The content of a particular message 1700 is used to populate the message table 1618 stored within the database 122, accessible by the messaging server application 116. Similarly, the content of a message 1700 is stored in memory as "in-transit" or "in-flight" data of the client device 102 or the application server 114. The message 1700 is shown to include the following components:

A message identifier 1702: a unique identifier that identifies the message 1700.

A message text payload 1704: text, to be generated by a user via a user interface of the client device 102 and that is included in the message 1700.

A message image payload 1706: image data, captured by a camera component of a client device 102 or retrieved from a memory component of a client device 102, and that is included in the message 1700.

A message video payload 1708: video data, captured by a camera component or retrieved from a memory component of the client device 102 and that is included in the message 1700.

A message audio payload 1710: audio data, captured by a microphone or retrieved from a memory component of the client device 102, and that is included in the message 1700.

A message annotation 1712: annotation data (e.g., filters, stickers or other enhancements) that represents annotations to be applied to message image payload 1706, message video payload 1708, or message audio payload 1710 of the message 1700.

A message duration parameter 1714: parameter value indicating, in seconds, the amount of time for which content of the message (e.g., the message image payload 1706, message video payload 1708, message audio payload 1710) is to be presented or made accessible to a user via the messaging client application 108.

A message geolocation parameter 1716: geolocation data (e.g., latitudinal and longitudinal coordinates) associated with the content payload of the message. Multiple message geolocation parameter 1716 values may be included in the payload, each of these parameter values being associated with respect to content items included in the content (e.g., a specific image into within the message image payload 1706, or a specific video in the message video payload 1708).

A message story identifier 1718: identifier values identifying one or more content collections (e.g., "stories") with which a particular content item in the message image payload 1706 of the message 1700 is associated. For example, multiple images within the message image payload 1706 may each be associated with multiple content collections using identifier values.

A message tag 1720: each message 1700 may be tagged with multiple tags, each of which is indicative of the subject matter of content included in the message payload. For example, where a particular image included in the message image payload 1706 depicts an animal (e.g., a lion), a tag value may be included within the message tag 1720 that is indicative of the relevant animal. Tag values may be generated manually, based on user input, or may be automatically generated using, for example, image recognition.

A message sender identifier 1722: an identifier (e.g., a messaging system identifier, email address, or device identifier) indicative of a user of the client device 102 on which the message 1700 was generated and from which the message 1700 was sent A message receiver identifier 1724: an identifier (e.g., a messaging system identifier, email address, or device identifier) indicative of a user of the client device 102 to which the message 1700 is addressed.

The contents (e.g., values) of the various components of message 1700 may be pointers to locations in tables within which content data values are stored. For example, an image value in the message image payload 1706 may be a pointer to (or address of) a location within an image table 1612. Similarly, values within the message video payload 1708 may point to data stored within a video table 1614, values stored within the message annotations 1712 may point to data stored in an annotation table 1616, values stored within the message story identifier 1718 may point to data stored in a story table 1606, and values stored within the message sender identifier 1722 and the message receiver identifier 1724 may point to user records stored within an entity table 1602.

In some embodiments, entity table 1602 comprises entity type and entity identity indicated by the first row key and the second row key as shown in FIG. 4-5 and FIG. 8-11. For example, an advertiser device 104 may operates multiple advertiser accounts that associated with a plurality of advertising campaigns, advertising squads, and advertisement associated under each advertiser accounts. An advertisement (e.g., ad 1 (v1) 738) may be an advertisement shown on an electronic device viewed by a user. An advertising squad (e.g., squad 1 (v1) 736) can be a collection of advertisements. An advertising campaign (e.g., campaign 1 (v1) 708) can be a collection of advertising squads that comprise a collection of advertisements. An advertiser account (e.g., account 1 (v1) 702) can be a collection of advertising campaigns that comprise a collection of advertising squads that comprise a collection of advertisements, etc.

According to some embodiments as shown in FIG. 7, a first advertising squad (e.g., squad 1) is associated with a first advertisement (e.g., ad 1) and a second advertisement (e.g ad 2). A second advertising squad (e.g., squad 2) is associated with a third advertisement (e.g., ad 3). A first advertising campaign (e.g., campaign 1) is associated with the first advertising squad (e.g., squad 1). A second advertising campaign (e.g., campaign 2) is associated with the second advertising squad (e.g., squad 2). An advertiser account (e.g., account 1) is associated with the first advertising campaign (e.g., campaign 1) and the second advertising campaign (e.g., campaign 2).

Figure 18:
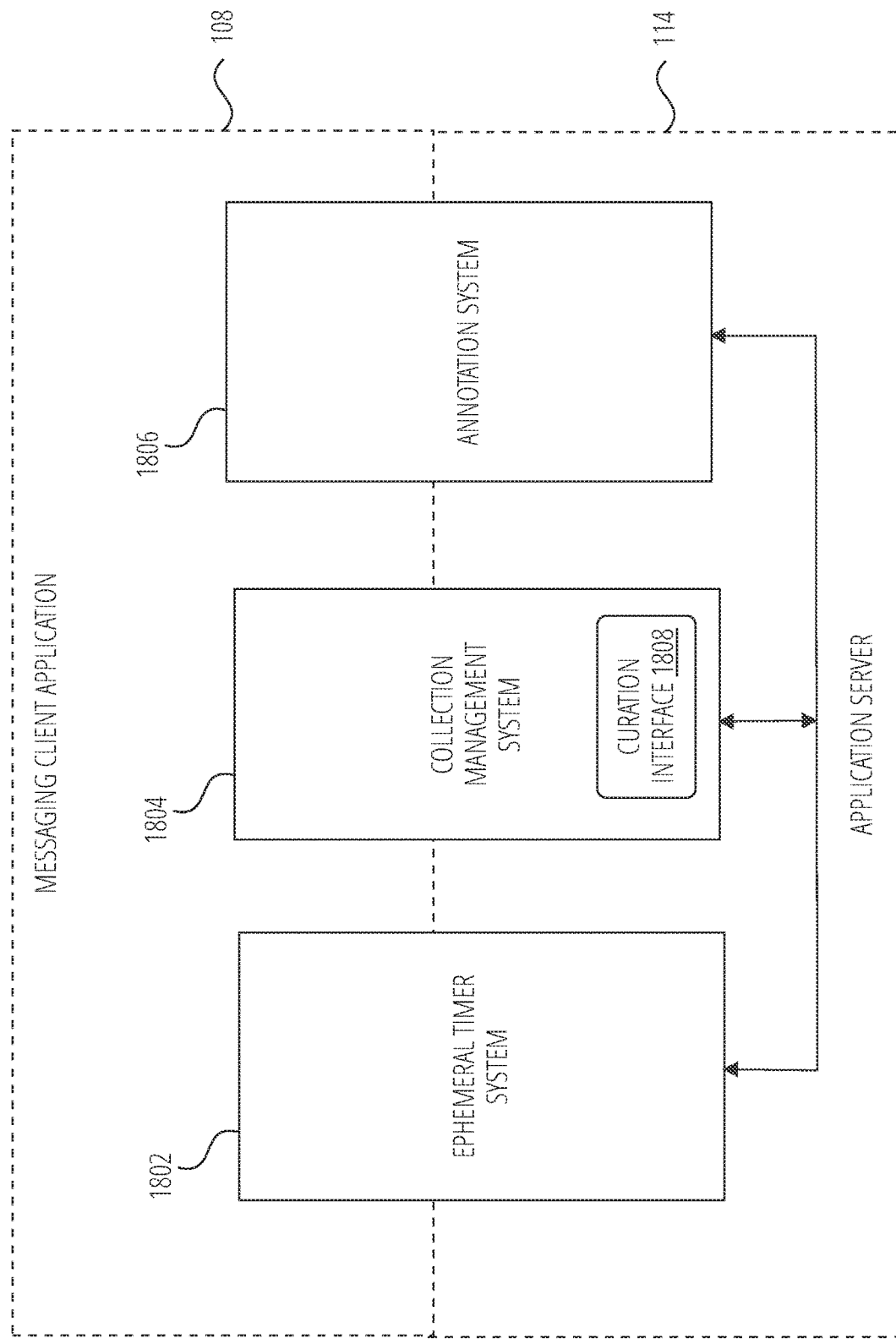
FIG. 18 is a diagrammatic representation of a messaging client application, in accordance with some example embodiments.

FIG. 18 is block diagram illustrating further details regarding the diagrammatic representation of a network environment 100, according to example embodiments. Specifically, the diagrammatic representation of a network environment 100 is shown to comprise the messaging client application 108 and the application server 114, which in turn embody a number of some subsystems, namely an ephemeral timer system 1802, a collection management system 1804 and an annotation system 1806.

The ephemeral timer system 1802 is responsible for enforcing the temporary access to content permitted by the messaging client application 108 and the messaging server application 116. To this end, the ephemeral timer system 1802 incorporates a number of timers that, based on duration and display parameters associated with a message, or collection of messages (e.g., a story), selectively display and enable access to messages and associated content via the messaging client application 108. Further details regarding the operation of the ephemeral timer system 1802 are provided below.

The collection management system 1804 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 1804 may also be responsible for publishing an icon that provides notification of the existence of a particular collection to the user interface of the messaging client application 108.

The collection management system 1804 furthermore includes a curation interface 1808 that allows a collection manager to manage and curate a particular collection of content. For example, the curation interface 1808 enables an event organizer to curate a collection of content relating to a specific event (e.g., delete inappropriate content or redundant messages). Additionally, the collection management system 1804 employs machine vision (or image recognition technology) and content rules to automatically curate a content collection. In certain embodiments, compensation may be paid to a user for inclusion of user-generated content into a collection. In such cases, the curation interface 1808 operates to automatically make payments to such users for the use of their content.

The annotation system 1806 provides various functions that enable a user to annotate or otherwise modify or edit media content associated with a message. For example, the annotation system 1806 provides functions related to the generation and publishing of media overlays for messages processed by the diagrammatic representation of a network environment 100. The annotation system 1806 operatively supplies a media overlay or supplementation (e.g., an image filter) to the messaging client application 108 based on a geolocation of the client device 102. In another example, the annotation system 1806 operatively supplies a media overlay to the messaging client application 108 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 1806 uses the geolocation of the client device 102 to identify a media overlay that includes the name of a merchant at the geolocation of the client device 102. The media overlay may include other indicia associated with the merchant. The media overlays may be stored in the database 122 and accessed through the database server 120.

In one example embodiment, the annotation system 1806 provides a user-based publication platform that enables users to select a geolocation on a map, and upload content associated with the selected geolocation. The user may also specify circumstances under which a particular media overlay should be offered to other users. The annotation system 1806 generates a media overlay that includes the uploaded content and associates the uploaded content with the selected geolocation.

In another example embodiment, the annotation system 1806 provides a merchant-based publication platform that enables merchants to select a particular media overlay associated with a geolocation via a bidding process. For example, the annotation system 1806 associates the media overlay of a highest bidding merchant with a corresponding geolocation for a predefined amount of time.

What is claimed is:

1. A method comprising:
   for each predetermined time period in a plurality of predetermined time periods,
   writing, by one or more processors, a plurality of data rows that includes a set of data associated with a plurality of active entities, a stats table including the plurality of data rows, and
   updating, by the one or more processors, an index table based on the plurality of data rows in the stats table, the index table including an index row;
   generating, by the one or more processors, a plurality of index values for the index row based on an index tree comprising at least a root node, and at least one intermediate level of at least one node and at least one leaf node, and each node except those in lowest level leaf nodes, including key information referencing one or more nodes in a next lower level of nodes;
   receiving, by the one or more processors, from an electronic device via an interface a query corresponding to an entity, the plurality of active entities includes the entity;
   retrieving, by the one or more processors, an index value from the plurality of index values for the index row, the index row corresponding to the entity, the index value corresponding to a current value associated with the entity;
   retrieving, by the one or more processors, the current value associated with the entity from the stats table using the index value;
   generating, by the one or more processors, a response to the query using the index value and the current value, the response including a plurality of counter values associated with the entity; and
   displaying, by the one or more processors, the response on a display of the electronic device.

2. The method of claim 1, wherein the one or more processors receive the query while the one or more processors write the plurality of data rows.

3. The method of claim 1, wherein each of the plurality of data rows in the stats table comprises plurality of counters including at least one of: a counter of a number of viewings, a counter of amount spent, or a counter of a number of interactions.

4. The method of claim 3, wherein the index row comprises a plurality of index values that correspond to current values for each of the plurality of active entities.

5. The method of claim 1, wherein the interface is a Representational State Transfer (REST) Application Program Interface (API).

6. The method of claim 3, wherein each of the plurality of data rows in the stats table comprises at least one of: an entity type, an entity identity, or a data version.

7. The method of claim 1, wherein the each predetermined time period is one hour, one day, one month, or one year.

8. The method of claim 4, wherein the index row further comprises a data category, an entity type, and an index root identity.

9. The method of claim 1, wherein a key value store database comprises the stats table and the index table.

10. The method of claim 1, further comprising:
    periodically loading, by the one or more processors, the index table in a cache.

11. A system comprising:
    one or more processors; and
    a memory storing instructions that, when executed by the one or more processors, configure the system to perform operations comprising:
    for each predetermined time period in a plurality of predetermined time periods, writing, by one or more processors, a plurality of data rows that includes a set of data associated with a plurality of active entities, a stats table including the plurality of data rows, and updating, by the one or more processors, an index table based on the plurality of data rows in the stats table, the index table including an index row;

generating, by the one or more processors, a plurality of index values for the index row based on an index tree comprising at least a root node, and at least one intermediate level of at least one node and at least one leaf node, and each node except those in lowest level leaf nodes, including key information referencing one or more nodes in a next lower level of nodes;

receiving, by the one or more processors, from an electronic device via an interface a query corresponding to an entity, the plurality of active entities includes the entity;

retrieving, by the one or more processors, an index value from the plurality of index values for the index row, the index row corresponding to the entity, the index value corresponding to a current value associated with the entity;

retrieving, by the one or more processors, the current value associated with the entity from the stats table using the index value;

generating, by the one or more processors, a response to the query using the index value and the current value, the response including a plurality of counter values associated with the entity; and displaying, by the one or more processors, the response on a display of the electronic device.

12. The system of claim 11, wherein the one or more processors receive the query while the one or more processors write the plurality of data rows.

13. The system of claim 11, wherein the interface is a Representational State Transfer (REST) Application Program Interface (API).

14. The system of claim 11, wherein each of the plurality of data rows in the stats table comprises plurality of counters including at least one of: a counter of a number of viewings, a counter of amount spent, or a counter of a number of interactions.

15. The system of claim 11, wherein the each predetermined time period is one hour, one day, one month, or one year.

16. The system of claim 11, wherein the index row comprises a plurality of index values that correspond to current values for each of the plurality of active entities.

17. The system of claim 11, wherein the operations further comprise:

periodically loading the index table in a cache.

18. A non-transitory computer-readable storage medium, the computer-readable storage medium including instructions that when executed by a computer, cause the computer to:

for each predetermined time period in a plurality of predetermined time periods, writing a plurality of data rows that includes a set of data associated with a plurality of active entities, a stats table including the plurality of data rows, and updating an index table based on the plurality of data rows in the stats table, the index table including an index row;

generating a plurality of index values for the index row based on an index tree comprising at least a root node, and at least one intermediate level of at least one node and at least one leaf node, and each node except those in lowest level leaf nodes, including key information referencing one or more nodes in a next lower level of nodes;

receiving from an electronic device via an interface a query corresponding to an entity, the plurality of active entities includes the entity;

retrieving an index value from the plurality of index values for the index row, the index row corresponding to the entity, the index value corresponding to a current value associated with the entity;

retrieving the current value associated with the entity from the stats table using the index value;

generating a response to the query using the index value and the current value, the response a plurality of counter values associated with the entity; and displaying the response on a display of the electronic device.

* * * * *